Patented Sept. 28, 1937

2,094,070

UNITED STATES PATENT OFFICE 2,094,070

PROCESS FOR RECOVERING H₂S FROM GASES

Gustaf Henrik Hultman and Claës-Wilhelm Pilo, Stockholm, Sweden

No Drawing. Application April 3, 1934, Serial No. 718,788. In Sweden April 7, 1933

6 Claims. (Cl. 23—181)

It is well known that gases containing hydrogen sulphide can be purified and separated from hydrogen sulphide by washing the gas containing hydrogen sulphide with an alkali carbonate solution, whereby the hydrogen sulphide is dissolved and bicarbonate and hydrosulphide formed. Three processes are known for removing the hydrogen sulphide from this solution. By the first of these air is forced through the solution whereby the hydrogen sulphide is carried off by the current of air. The hydrogen sulphide content in this current of air is, however, too low to permit its being exploited or utilized directly and too high for being released directly into the atmosphere in populous districts. As a rule it is used as combustion air in steam boilers, coke furnaces or the like. The second process for removing the hydrogen sulphide from the carbonate solution containing hydrogen sulphide consists in the hydrogen sulphide being evacuated, after which the regenerated carbonate solution is used for renewed washing. The hydrogen sulphide is then recovered in such a concentrated form that it can be converted into sulphur in a Claus furnace or in some other way or combusted directly into sulphur dioxide for the manufacture of sulphuric acid.

Both these processes possess, however, the drawback or disadvantage that in continuous operation the bulk of the original admixture of neutral carbonate is converted into bicarbonate through absorption of carbon dioxide present in the gas. According to what experience has shown the bicarbonate in the solution which by these known processes in introduced into the washer constitutes approximately two-thirds of the total carbonate content. Since the absorption of hydrogen sulphide can be explained by the reaction

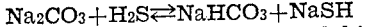

the capacity of absorbing hydrogen sulphide must according to the law of mass effect be considerably less if the solution already before absorption contains NaHCO₃. The moment the absorption capacity is diminished the quantity of the absorption agent, i. e. the washing fluid, must as a matter of course be increased, which entails increased dimensions of the entire apparatus, increased consumption of energy and consequently increased costs of purification.

The third process for removing hydrogen sulphide from the solution containing sulphur consists in carbonic acid being forced through the solution. In this process the neutral carbonate as well as the hydrosulphide is converted into bicarbonate and the hydrogen sulphide passes off with the surplus of carbonic acid. The solution of bicarbonate is by boiling converted into neutral carbonate, and the carbonic acid released in the process is used for the aforesaid removal of the sulphide. The mixture of carbonic acid and hydrogen sulphide obtained in the expulsion of hydrogen sulphide has such a low content of hydrogen sulphide that it can be exploited or utilized only by absorption in a purification compound whereby thus a very inferior sulphur is obtained.

The present invention relates now to a method to remove and do away with the aforesaid drawbacks and disadvantages. This process is characterized in principle by the step that the gas is washed in a solution with a great absorption capacity for hydrogen sulphide and that this absorption capacity after absorption, by an admixture of chemical reagents is reduced for the very purpose of facilitating the removal of the hydrogen sulphide, after which ultimately, when the hydrogen sulphide has been removed, the absorption capacity is increased to the original value by removing the said admixtures from the whole or possibly a part of the solution. The solution thus regenerated is then employed over again for washing out hydrogen sulphide.

If the process according to the invention is to be carried out by way of example with a solution of alkali carbonate, the gas is washed in a known manner with a solution of neutral alkali carbonate. From the washer the carbonate solution containing hydrogen sulphide, is introduced into a closed tank or container where the solution is brought into intimate contact with carbonic acid that is forced in below, at or above atmospheric pressure until the bulk of the carbonate in the solution has been converted into bicarbonate. By this means, as has been explained above, the capacity of absorption is reduced so that there are no difficulties in practically removing altogether the hydrogen sulphide, which can suitably be done in a vacuum at ordinary or slightly increased temperature, which must, however, not be so high that any very large quantity of carbonic acid passes off. After removing the hydrogen sulphide the solution is brought to boiling point when the carbonic acid passes off so that the bicarbonate once more is converted into neutral carbonate, after which the solution thus obtained is again employed for washing. The carbonic acid released in the boiling process is employed afresh for reducing the absorption capacity of the solution containing hydrogen sulphide.

The fact that no larger quantities of carbonic acid pass off simultaneously with hydrogen sulphide in the aforesaid vacuum distillation can be explained by the circumstance that the reaction speed for the disintegration of the bicarbonate is much less than the reaction speed in the disintegration of the hydrosulphide.

By the process according to the invention the following advantages are thus gained.

(1) By washing the gas with neutral carbonate the washing becomes practically perfect.

(2) On account of the greater absorption capacity of the neutral carbonate in comparison with the mixture of bicarbonate and carbonate, which is introduced into the washer in the first two of the above described known processes, the requisite quantity of washing fluid is very small, entailing the fact that the size of the apparatus, consumption of energy and consequently also the costs of purification are small.

(3) The hydrogen sulphide is obtained in such a concentrated form that it can be converted into sulphur in a Claus furnace or in some other known way or directly burnt into sulphur dioxide for the manufacture of sulphuric acid.

It will of course be understood that the expression "neutral alkali carbonate" as herein used is intended to include any substance with a capacity for absorbing hydrogen sulphide and whose absorption capacity by suitable admixtures can be reduced in order afterwards to be increased afresh by the removal of the admixtures, for instance, by the use of potassium carbonate ($K_2CO_3$) it is possible to operate with a more concentrated solution owing to the fact that $KHCO_3$ is much more easily soluble than $NaHCO_3$.

We claim:

1. A process of recovering hydrogen sulphide in concentrated form from gases containing such hydrogen sulphide which consists in washing the gases with a solution of a normal carbonate of an alkali metal having high solubility for hydrogen sulphide and thereby dissolving hydrogen sulphide, treating the solution while containing the hydrogen sulphide with carbon dioxide sufficient only to convert the normal carbonate into bicarbonate and without removal of the hydrogen sulphide and thereby decreasing the hydrogen sulphide absorption capacity, boiling the solution at a low temperature under vacuum to expel the hydrogen sulphide in steam saturated condition, removing the expelled hydrogen sulphide, and continuing the boiling at higher temperature and pressure to convert the bicarbonate to normal carbonate and thereby to restore the hydrogen sulphide absorption capacity to the solution, and reconducting the liberated carbon dioxide into said solution after the renewed washing operation for again reducing its absorptive capacity for hydrogen sulphide, thus continuing the cyclic process as above described.

2. A continuous cyclic process of separating hydrogen sulphide from a gas containing the same and recovering the hydrogen sulphide in concentrated form, which comprises washing the gas with a solution of a normal carbonate of an alkali metal having a high absorptive capacity for hydrogen sulphide, dissolving carbon dioxide in the solution after it has absorbed the hydrogen sulphide to reduce the absorptive capacity of the solution for the latter while maintaining the hydrogen sulphide in the solution during said dissolving action, separating thereafter the hydrogen sulphide from the solution, subsequently removing the carbon dioxide from said solution to restore thereby its high absorptive capacity for hydrogen sulphide so that it may be reemployed for renewed washing, and reconducting the liberated carbon dioxide into said solution after the renewed washing operation for again reducing its absorptive capacity for hydrogen sulphide, thus continuing the cyclic process as above described.

3. A continuous cyclic process of separating hydrogen sulphide from a gas containing the same and recovering the hydrogen sulphide in concentrated form, which comprises washing the gas with a potassium carbonate solution having a high absorptive capacity for hydrogen sulphide, dissolving carbon dioxide in the solution after it has absorbed the hydrogen sulphide to reduce the absorptive capacity of the solution for the latter while maintaining the hydrogen sulphide in the solution during said last dissolving action, separating thereafter the hydrogen sulphide from the solution, subsequently removing the carbon dioxide from said solution to restore thereby its high absorptive capacity for hydrogen sulphide so that it may be reemployed for renewed washing, and reconducting the liberated carbon dioxide into said solution after the renewed washing operation for again reducing its absorptive capacity for hydrogen sulphide, thus continuing the cyclic process as above described.

4. A continuous cyclic process of separating hydrogen sulphide from a gas containing the same and recovering the hydrogen sulphide in concentrated form, which comprises washing the gas with a sodium carbonate solution having a high absorptive capacity for hydrogen sulphide, dissolving carbon dioxide in the solution after it has absorbed the hydrogen sulphide to reduce the absorptive capacity of the solution for the latter while maintaining the hydrogen sulphide in the solution during said last dissolving action, separating thereafter the hydrogen sulphide from the solution, subsequently removing the carbon dioxide from said solution to restore thereby its high absorptive capacity for hydrogen sulphide so that it may be reemployed for renewed washing, and reconducting the liberated carbon dioxide into said solution after the renewed washing operation for again reducing its absorptive capacity for hydrogen sulphide, thus continuing the cyclic process as above described.

5. A continuous cyclic process of separating hydrogen sulphide from a gas containing the same and recovering the hydrogen sulphide in concentrated form, which comprises washing the gas with an alkali metal carbonate solution, dissolving carbon dioxide in the solution after it has absorbed the hydrogen sulphide to reduce the absorptive capacity of the solution for the latter while maintaining the hydrogen sulphide in the solution during said dissolving action, separating thereafter the hydrogen sulphide from the solution, subsequently removing the carbon dioxide from said solution to restore thereby its high absorptive capacity for hydrogen sulphide so that it may be reemployed for renewed washing, and reconducting the liberated carbon dioxide into said solution after the renewed washing operation for again reducing its absorptive capacity for hydrogen sulphide, thus continuing the cyclic process as above described.

6. A continuous cyclic process of separating hydrogen sulphide from a gas containing the same and recovering the hydrogen sulphide in concentrated form, which comprises washing the gas with an alkali metal carbonate solution, introducing the solution after it has absorbed the hydrogen sulphide into a closed container, dissolving carbon dioxide in the solution to convert the normal carbonate into bicarbonate whereby its absorptive capacity of hydrogen sulphide is diminished while maintaining the hydrogen sulphide in the solution during said dissolving action, separating thereafter the hydrogen sulphide from the solution by distillation under vacuum, subsequently removing the carbon dioxide by boiling the bicarbonate solution after it has been deprived of hydrogen sulphide and thereby converting the bicarbonate solution again into a normal carbonate solution so that it may be reemployed for renewed washing, and reconducting the liberated carbon dioxide into said solution in the closed container after the renewed washing operation for again reducing its absorptive capacity for hydrogen sulphide, thus continuing the cyclic process as above described.

GUSTAF HENRIK HULTMAN.
CLAËS-WILHELM PILO.